March 29, 1966 W. E. LOCK 3,243,521
FERRITE MAGNETIC TRANSDUCER ASSEMBLY HAVING LOW
WEAR CONSTRUCTION
Filed Feb. 20, 1962 2 Sheets-Sheet 1

WALTER E. LOCK
INVENTOR.

BY Nathan N. Kallman

ATTORNEY

March 29, 1966 W. E. LOCK 3,243,521

FERRITE MAGNETIC TRANSDUCER ASSEMBLY HAVING LOW WEAR CONSTRUCTION

Filed Feb. 20, 1962 2 Sheets-Sheet 2

WALTER E. LOCK
INVENTOR.

BY Nathan N. Kallman

ATTORNEY

United States Patent Office 3,243,521

Patented Mar. 29, 1966

3,243,521

FERRITE MAGNETIC TRANSDUCER ASSEMBLY HAVING LOW WEAR CONSTRUCTION

Walter E. Lock, San Jose, Calif., assignor to Ampex Corporation, Redwood City, Calif., a corporation of California Filed Feb. 20, 1962, Ser. No. 174,573

4 Claims. (Cl. 179—100.2)

This invention relates to an improved magnetic transducer, and in particular to a transducer formed substantially from a ferrite material.

Ferrites are highly preferable for use as cores of magnetic transducers or heads because they are relatively hard, afford lower losses during the recording and reproducing modes, and operate well at high frequencies. However, ferrites are known to be brittle and generally require reinforcement in order to prevent chipping and cracking. Therefore, magnetic heads have been made that utilize ferrite cores and metallic pole pieces, such as Alfenol, disposed on either side of a nonmagnetic gap to provide mechanical strength. During operation in a magnetic tape apparatus that employs a rotary head assembly for wideband recording, for example, the metallic pole pieces are subject to rapid wear requiring frequent replacement of the rotary heads. Thus, it would be preferable to employ a ferrite structure without the metallic pole pieces, because the ferrite is relatively hard, and does not wear as rapidly as the metallic pole pieces.

It has been proposed to employ a glass bond in the nonmagnetic gap of a ferrite transducer to minimize gap erosion and to provide increased head life. In copending patent application Serial No. 103,424, entitled "Magnetic Transducer Assembly and Manufacture," filed in behalf of R. F. Pfost on April 17, 1961, assigned to the same assignee, a novel method and means for forming a magnetic transducer from ferrite with a glass gap is set forth. Such type of magnetic transducer has been operated successfully with magnetic tape apparatus employing a rotary head assembly that scans a longitudinally moving tape transversely. However, the structure defined in the above application still experiences some undesirable erosion of the ferrite material along the surface edges adjacent to the gap that engages the moving tape during operation of the tape apparatus. Such erosion of the ferrite occurs in those areas where the gap surface meets the walls of the ferrite core forming sharp corners or arrises.

An object of this invention is to provide an improved magnetic transducer having a ferrite core.

Another object of this invention is to provide a novel configuration for a ferrite transducer having a glass transducing gap whereby erosion is minimized and the transducer life is increased.

According to this invention, a magnetic transducer comprises a ferrite core with a nonmagnetic glass gap, and has a novel configuration that minimizes erosion. The magnetic transducer is formed preferably from a high density and low porosity ferrite material in a wedge shaped configuration, and is bisected by a very thin layer of glass having a coefficient of thermal expansion substantially the same as that of the ferrite. The glass layer, which creates a nonmagnetic gap in the ferrite transducer, extends from a tape engaging surface, hereinafter termed the front gap surface, to a rear gap surface. To accommodate an energizing coil, an aperture is located in the transducer closely adjacent to the front gap surface that engages the tape. The front gap surface of the transducer is relatively small in surface area compared to the opposing rear gap surface, and is substantially rectangular having a pair of longitudinal sides bisected by the glass gap.

In accordance with this invention, the longitudinal sides of the front gap surface that contact the tape as the rotating transducer traverses the magnetic tape are rounded or beveled so that there are no sharp corners or arrises. In this manner, undesirable chipping and erosion of the ferrite body is substantially eliminated.

The invention will be described in greater detail with reference to the drawing in which.

Like numerals refer to like elements throughout the drawing.

Figure 1:
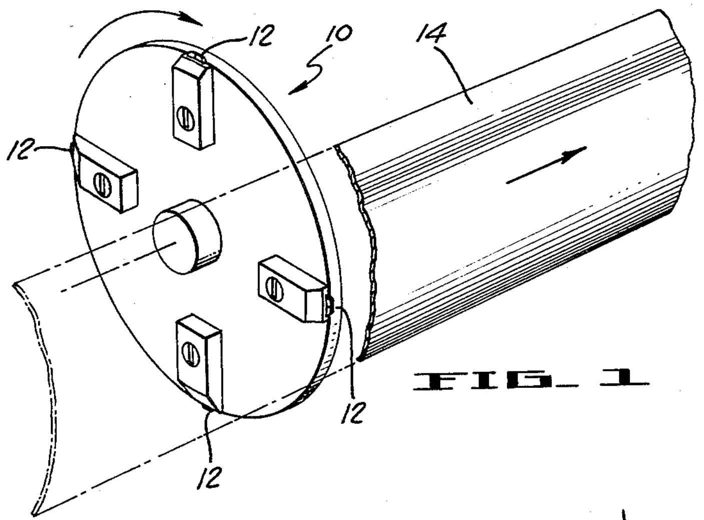
FIGURE 1 is a perspective view of a rotary head assembly such as used in a transverse recording and reproducing system, with the contacting magnetic tape shown in cut-away.

In FIGURE 1, a rotary head assembly 10 is illustrated carrying a plurality of transducers 12 at its periphery, such as utilized in a transverse recording and reproducing apparatus. A magnetic tape 14 is moved longitudinally, as shown by the arrow, past the rotating head drum 10 and in contact therewith, whereby the magnetic transducers 12 define transverse tracks registering transduced signal information. When operating a magnetic tape apparatus for wideband frequency or television signal recording, the rotating drum 10 is moved at a high speed relative to the tape 14. The transducers 12 engage the tape 14 very firmly in a penetrating relationship to maintain a proper tensioning of the tape. The rapid relative motion of the transducers and the tape and the frictional effects caused by the initmate contact of the transducers and the tape cause an undesirable erosion and deterioration of the transducer structure, thereby materially reducing the width of the recorded track, with consequent reduction of the signal-to-noise ratio. However, by means of the instant invention, there is provided a novel configuration for a transducer that cooperates with the arcuately shaped moving tape so that erosion and wear are minimized.

Figure 2:
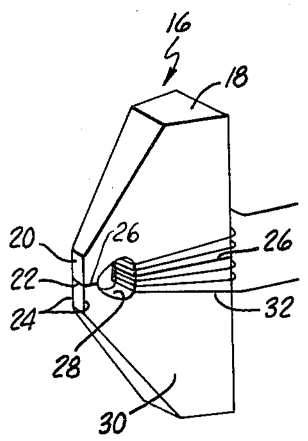
FIGURE 2 is a perspective view of a wedge type transducer, such as employed with the rotary head assembly of FIGURE 1.

In FIGURE 2, there is shown a wedge type transducer 16 formed from a ferrite body 18, such as employed with the rotary head assembly 10 of FIGURE 1. This form of transducer 16 is described in the aforementioned patent application Serial No. 103,424, and affords the advantages of mechanical strength, high resolution, uniformity, and simple replacement.

In particular, the wedge shaped transducer 16 is formed from a shaped ferrite body 18 having a rectangular front gap surface 20 with a glass gap 22 bisecting the longitudinal sides 24 of the rectangular surface 20. The glass gap 22 is formed by a thin planar glass bond 26 that extends from the front gap surface 20 to the rear gap surface of the transducer 16. An aperture 28 is located along the plane of the glass bond 26 and close to the front gap surface 20, and extends from a tapered wall 30 through the transducer 16 to an opposing flat wall. An energizing coil 32 is wound through the aperture 28 to provide coupling between the electrical and magnetic circuits of the magnetic tape system.

Figure 3:
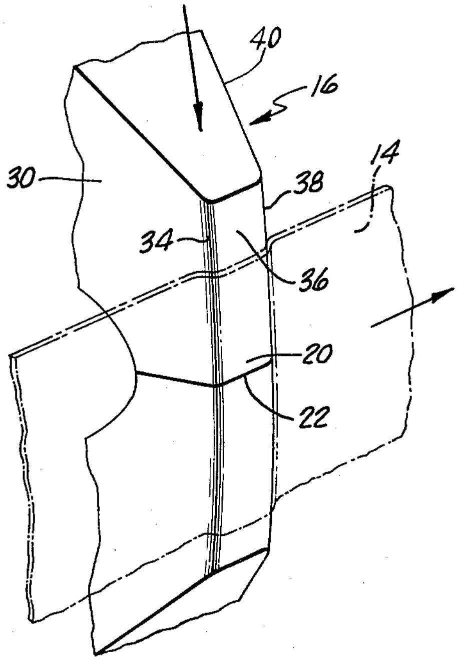
FIGURE 3 is an enlarged fragmentary perspective view of the contacting areas of the transducer of this invention and the tape.

In FIGURE 3, the contacting portions of the magnetic tape 14 and the transducer 16 are shown in detail. As the tape 14 is moved longitudinally between supply and takeup reels (not shown), the transducer 16 that is mounted on a rotary head drum is moved transversely to the direction of tape motion.

It is noted that the magnetic tape 14 first contacts a leading edge portion 34 of the front gap surface 20, then traverses a level portion 36 of the front gap surface, and finally leaves the magnetic transducer 16 at a trailing edge portion 38 of the front gap surface. In prior arrangements, sharp pointed edges were formed by the abutments of the tapered wall 30 and the opposite flat wall 40 respectively with the front gap surface 20. These sharp edges or corners caused the ferrite to chip and crack resulting in deterioration and erosion along the longitudinal sides of the front gap surface 20. This chipping and erosion affected the linearity of the gap area thus decreasing signal resolution.

Figure 4A:
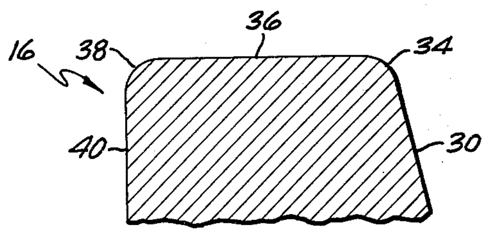
FIGURES 4A and 4B are fragmentary views, in section, of the tape engaging portions of the transducer, as provided by this invention.

In FIGURE 4A, the leading edge portion 34 and trailing edge 38 are rounded so that they blend respectively into the tapered wall 30 and flat wall 40 in a smooth arcuate shape. It has been found that by presenting a rounded leading edge 34 and a rounded trailing edge 38 to the magnetic tape, chipping, cracking and erosion were substantially eliminated thereby increasing the operating characteristics and life of the ferrite transducers. For example, the average life of wideband frequency transducers formed from ferrite and having Alfenol pole pieces was approximately 200 hours. In contrast, a magnetic transducer made of ferrite with a glass gap, and having the rounded edges in accordance with this invention, has an approximate life of about 1000 hours. By way of example, the rounded edges may have a .0003 inch radius and the width of the front gap surface may be .010 inch.

Figure 4B:
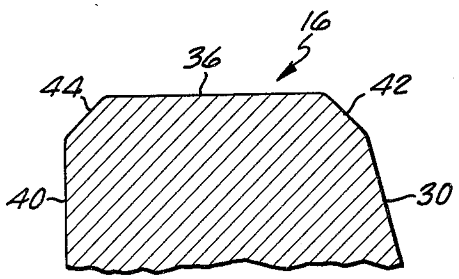

In FIGURE 4B, an alternative configuration for the front gap surface 20 and the leading and trailing edge is illustrated. In this embodiment, the leading edge 42 is angular and presents an oblique surface to the approaching magnetic tape. Similarly, the trailing edge 44 is angular and serves to reduce chipping and erosion of the ferrite.

Figure 5A:
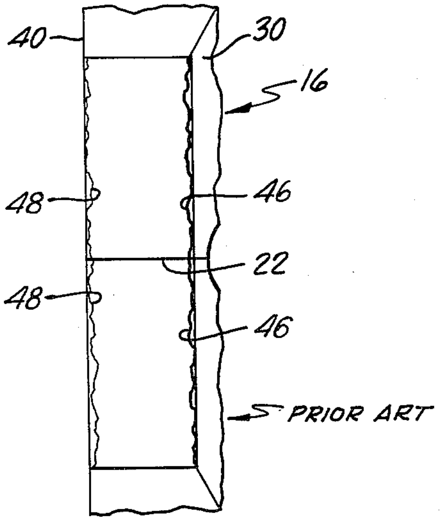
FIGURES 5A and 5B are plan views of the tape engaging surface, as it appears with the prior art construction and the novel configuration of this invention respectively.
Figure 5B:
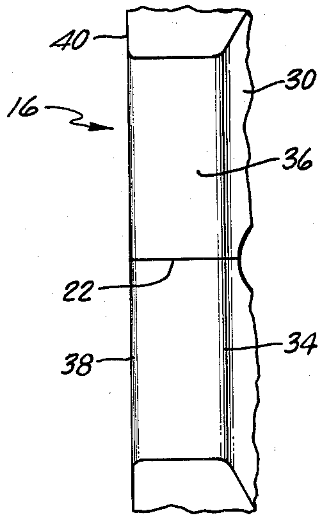

FIGURES 5A and 5B are enlarged views of photomicrographs of the front gap surface 20 taken after the use of a prior art magnetic transducer and a transducer formed in accordance with this invention respectively with a transverse magnetic tape apparatus. FIGURE 5A illustrates the front gap surface of the prior art ferrite transducer formed with sharp edges that was used in a rotary head assembly of a transverse magnetic recording system. The erosion and deterioration of the leading and trailing edges 46 and 48 are clearly evident. In FIGURE 5B there is shown the front gap surface of a similar ferrite transducer, but having rounded leading and trailing edges, in accordance with the invention. After the same period of extended use in a wideband frequency recorder, the leading and trailing edges still had the same smooth contours as they had prior to operation.

Thus with the inventive configuration set forth above, the life of magnetic transducers may be increased, and an improvement in signal-to-noise ratio achieved with a better defined gap area.

What is claimed is:

1. An improved rotary head magnetic transducer for transducing wideband frequency signals in cooperation with a longitudinally moving magnetic tape comprising:

a ferrite core having a wedge shape configuration;
a glass gap bisecting the core configuration;
a front gap surface including said glass gap for transversely engaging the moving magnetic tape;

such front gap surface having a level rectangular portion bounded by a leading edge portion and a trailing edge portion both substantially perpendicular to said gap and disposed in substantially transverse relation to the longitudinal movement of the tape, said edge portions being each machined to define smooth obtuse edges therealong.

2. An improved rotary head magnetic transducer for transducing wideband frequency signals in cooperation with a longitudinally moving magnetic tape comprising:

a ferrite core having a wedge shape configuration;
a glass gap bisecting the core configuration;
a front gap surface including said glass gap for transversely engaging the moving magnetic tape in a signal transducing relation;
such front gap surface having a level rectangular portion bounded by a leading edge portion and a trailing edge portion both substantially perpendicular to said gap and disposed in substantially transverse relation to the longitudinal movement of the tape, said edge portions being rounded to form an obtuse curvature having a radius of approximately an order of magnitude smaller than the perpendicular distance between the leading and trailing edge portions.

3. An improved rotary head magnetic transducer for transducing wideband frequency signals in cooperation with a longitudinally moving magnetic tape comprising:

a ferrite core having a wedge shape configuration;
a glass gap bisecting the core configuration;
a front gap surface including said glass gap for transversely engaging the moving magnetic tape in a signal transducing relation;
such front gap surface having a level rectangular portion bounded by a leading edge portion and a trailing edge portion both substantially perpendicular to said gap and disposed in substantially transverse relation to the longitudinal movement of the tape, said edge portions each being beveled at an angle to the level rectangular portion to define smooth obtuse edges therealong.

4. In a magnetic tape recording and reproducing apparatus wherein a rotary head assembly scans a longitudinally moving magnetic medium transversely, an improved magnetic transducer comprising:

a ferrite body having a substantially rectangular front gap surface for transducer engagement across the moving magnetic medium;
a pair of walls abutting the sides of such rectangular surface in transverse alignment with the moving medium;
a glass gap bisecting such front gap surface and disposed in a transverse plane relative to said pair of walls;
a smooth obtuse edge portion disposed between each of said walls and the front gap surface and extending therealong in transverse engagement with the longitudinally moving magnetic medium.

References Cited by the Examiner

UNITED STATES PATENTS

| | | | |
|---|---|---|---|
| 2,715,659 | 8/1955 | Ibuka et al. | 179—100.2 |
| 3,024,318 | 3/1962 | Duinker et al. | 179—100.2 |
| 3,026,379 | 3/1962 | Carpenter | 179—100.2 |
| 3,046,359 | 7/1962 | Warren | 179—100.2 |
| 3,124,661 | 3/1964 | Trapp | 179—100.2 |
| 3,170,031 | 2/1965 | Okamura | 179—100.2 |

BERNARD KONICK, *Primary Examiner.*

IRVING L. SRAGOW, *Examiner.*